Patented Mar. 28, 1950

2,502,392

UNITED STATES PATENT OFFICE 2,502,392

FLUIDS FOR HYDRAULIC AND DIELECTRIC USES

James S. Sconce, Arnold N. Johnson, and John T. Rucker, Niagara Falls, N. Y., assignors to Hooker Electrochemical Company, Niagara Falls, N. Y., a corporation of New York No Drawing. Application May 22, 1945,
Serial No. 595,248

5 Claims. (Cl. 252—78)

Our invention relates more particularly to fluids for transmission of mechanical thrust or torque, as in hydraulic brakes or fluid coupling systems, or for electrical insulation, as in transformers. For such purposes some or all of the following properties are important:

(1) High boiling point
(2) Low freezing point
(3) Low viscosity
(4) High specific gravity
(5) Low vapor pressure
(6) High firesafeness
(7) Stability against decomposition
(8) High dielectric strength In the case of fluids that are to be used in fluid couplings, properties (1), (3), (5), (6) and (7) are of obvious importance, as these fluids are subjected to the work of friction. In such couplings, property (4) is also of advantage, since the coupling effect is due to the impact of fluid upon the vanes of the driven element. Thus, with a fluid of high specific gravity there will be less slippage than with a fluid of low specific gravity, or the vanes may be made smaller. Property (2) is likewise important, as the fluid may be subjected to winter temperature when not in use. It must under these conditions remain not merely a liquid, but a liquid of low viscosity.

The most obvious hydraulic transmission fluid is of course water, but water has too low a boiling point and too high a freezing point to be practicable for most purposes. The next most obvious fluids for hydraulic transmission are the hydrocarbons, but most of these are either too volatile or too viscous. Kerosene, which is mostly dodecane, is a hydrocarbon that is much used for hydraulic transmission; but kerosene is too volatile and has too high a freezing point and too low a boiling point to be ideal for this purpose. Another fluid that has been used is "non-viscous neutral oil." This is too viscous to be ideal and its viscosity is very much affected by temperature. Still another fluid that has been proposed is a mixture of ethyl chlorobenzenes. This is very much more viscous than any of the others named. However, these will serve for purpose of comparison.

Many chlorinated hydrocarbons have high boiling points and low freezing points, but these generally lack some other characteristic that is essential for our purposes. Moreover, chlorinated aliphatic hydrocarbons having chlorine attached to a primary carbon atom joined to another carbon atom by a single bond are generally unstable, tending to split off chlorine as HCl and become quite corrosive to metals.

We have now found that hexachlorbutadiene and certain isopropyl chlorbenzenes, e. g., isopropyl dichlorbenzene (dichlorcumene), isopropyl trichlorbenzene (trichlorcumene) and di-isopropyl trichlorbenzene, possess in high degree the above enumerated properties, having high boiling points and low freezing points, as well as having a relatively high specific gravity, which renders them particularly well suited to fluid couplings. They also have a high dielectric strength, which renders them well suited to use as transformer oils, etc. Moreover, hexachlorbutadiene, which contains only vinyl chlorine, i. e., chlorine attached to a carbon atom which in turn was attached to one or more other carbon atoms by a linkage including a double bond, is on that account very stable against splitting off of chlorine, compared with chlorinated aliphatic hydrocarbons in general, even at temperatures up to its boiling point. It is also very water repellent and non-reactive, refusing to react even with chlorine. The isopropyl chlorbenzenes are still more stable, having no chlorine in their alkyl groups.

Thus under the standard Navy hydraulic stability test, which consists in treating the material with sodium bicarbonate for four hours at 95° C., and determining the pick up of chlorine by the alkali, purified hexachlorbutadiene and trichlorcumene show, respectively, hydrolyzable chlorine amounting to 0.2 approximately .0057 gram per ml. of material tested.

The freezing points of the isopropyl chlorbenzenes and hexachlorbutadiene may be further reduced without seriously impairing their other desirable properties, by blending with minor proportion of a suitable hydrocarbon oil or unsaturated chlorinated or oxidized hydrocarbon of the group including trichlorbenzene, orthodichlorbenzene, trichlorethylene, perchlorethylene, hexachlorpropylene, alphachlornaphthalene, diphenyl oxide and pentachlordiphenyl.

2,502,392

However, the blends of hexachlorbutadiene and trichlorcumene with each other are particularly important. The physical properties of hexachlorbutadiene and trichlorcumene and their blends are shown in the following table, in which the corresponding characteristics of kerosene are also given for comparison, kerosene being chosen as typical of the prior art.

| Physical Properties | Kerosene | Hexachlorbutadiene-Trichlorcumene mixtures, Percent hexachlorbutadiene, by weight | | | |
|---|---|---|---|---|---|
| | | 100 | 70 | 50 | 0 |
| Boiling Point, °F | 419 | 419 | 428 | 437 | 491 |
| Freezing Point, °F | −20 | −5 | −41 | −66 | −37 |
| Viscosity, 0° F.¹ | 6.9 | 5.5 | 8.1 | 11 | 20 |
| Viscosity, 32° F | 3.9 | 3.2 | 4.2 | 5.1 | 8.0 |
| Viscosity, 100° F | 1.75 | 1.5 | 1.7 | 1.9 | 2.3 |
| Viscosity, 210° F | .85 | .72 | .76 | .80 | .89 |
| Sp. Gr., 32° F | .83 | 1.71 | 1.57 | 1.49 | 1.32 |
| Sp. Gr., 100° F | .80 | 1.65 | 1.52 | 1.45 | 1.28 |
| Sp. Gr., 210° F | .76 | 1.56 | 1.50 | 1.37 | 1.23 |
| Vap. Press., 50° C.² | 10.0 | 1.2 | .2 | | |
| Vap. Press., 100° C | 43.0 | 22.0 | 15.1 | 12.0 | 6.5 |
| Vap. Press., 150° C | 210.0 | 134.5 | 110.1 | 87.5 | 34.0 |
| Vap. Press., 200° C | 1,000.0 | 550.0 | 490.0 | 400.0 | 180.0 |
| Flash Point, °C | 49 | None | 173 | 152 | 125 |
| Stability ³ | | | 0.2 | | .0057 |
| Breakdown Volts | 30,000 | 30,000 | | | 30,000 |

¹ Centistokes.
² mm. of Hg.
³ mg. of hydrolyzable chlorine per ml., Navy test.

An examination of the foregoing table shows that hexachlorbutadiene and trichlorcumene and their mixtures have about the same boiling point and dielectric strength as kerosene and about the same viscosity within the working temperature range, but are generally superior in respect of the other characteristics that are important in a fluid that is to be used for hydraulic transmission. Thus, these products have a much lower vapor pressure and higher specific gravity than kerosene, besides being much more fire safe. Their mixtures also have notably lower freezing points.

While we have given in detail the properties of hexachlorbutadiene and trichlorcumene and their mixtures, we do not wish to be limited to these materials and mixtures, as these materials and their mixtures have useful properties when mixed with minor proportions of the other mixtures we have listed above.

We claim as our invention:
1. A hydraulic fluid consisting essentially of a mixture of hexachlorobutadiene and isopropyl trichlorobenzene in proportions to produce a mixture having a freezing point below minus 37° F.

2. The new compositions claimed in claim 1, having added thereto a compound of the group consisting of trichlorbenzene, orthodichlorbenzene, trichlorethylene, perchlorethylene, hexachlorpropylene, alphachlornapthalene, and pentachlordiphenyl, in proportions sufficient to lower the freezing points of said compositions, but insufficient materially to affect the other properties thereof.

3. As new compositions of matter, useful as fluid media for transmission of mechanical thrust and torque under conditions liable to subject them to extremes of low atmospheric temperature and high temperature resulting from heat generated through work of friction, mixtures of hexachlorbutadiene and isopropyl trichlorbenzene, in the proportions of 30 to 50 per cent of the latter by weight, boiling at 428 to 437° F. and stable at their boiling temperatures, freezing at −41 to −66° F., having vapor pressures of 400 to 490 mm. of mercury at 392° F., specific gravities of 1.49 to 1.57 at 32° F., viscosities of 11 to 0.76 centistokes at 0° to 210° F., and flash points of 152 to 173° C., and giving off less than 0.2 mg. of chlorine per ml. when contacted with sodium bicarbonate for four hours at 202° F.

4. As a new composition of matter, useful as a fluid medium for transmission of mechanical thrust and torque, under conditions liable to subject it to extremes of low atmospheric temperature and high temperature resulting from heat generated through work of friction, a mixture of hexachlorbutadiene and isopropyl trichlorbenzene, in the proportions of substantially 30 per cent of the latter by weight, boiling at substantially 428° F. and stable at that temperature, freezing at substantially −41° F., having a vapor pressure of substantially 490 mm. of mercury at 392° F., a specific gravity of substantially 1.57 at 32° F., a viscosity of substantially 8.1 to 0.76 centistokes at 0° to 210° F., and flash point of substantially 173° C., and giving off less than 0.2 mg. of chlorine per ml. when contacted with sodium bicarbonate for four hours at 202° F.

5. As a new composition of matter, useful as a fluid medium for transmission of mechanical thrust and torque, under conditions liable to subject it to extremes of low atmospheric temperature and high temperature resulting from heat generated through work of friction, a mixture of hexachlorbutadiene and isopropyl trichlorbenzene, in substantially equal proportions by weight, boiling at substantially 437° F. and stable at that temperature, freezing at substantially −66° F., having a vapor pressure of substantially 400 mm. of mercury at 392° F., a specific gravity of substantially 1.49 at 32° F., and a flash point of substantially 152° C., and giving off less than 0.2 mg. of chlorine per ml. when contacted with sodium bicarbonate for four hours at 202° F.

JAMES S. SCONCE.
ARNOLD N. JOHNSON.
JOHN T. RUCKER.

REFERENCES CITED

The following references are of record in the file of this patent:

UNITED STATES PATENTS

| Number | Name | Date |
|---|---|---|
| 1,998,309 | Clark | Apr. 16, 1935 |
| 2,171,855 | Levine | Sept. 5, 1939 |
| 2,174,289 | Levine | Sept. 26, 1939 |
| 2,185,639 | Levine | Jan. 2, 1940 |
| 2,186,960 | Dreisbach | Jan. 16, 1940 |
| 2,252,858 | Mugdan | Aug. 18, 1941 |
| 2,269,600 | Mugdan | Jan. 13, 1942 |
| 2,308,903 | Wimmer | Jan. 19, 1943 |
| 2,342,414 | Magill | Feb. 22, 1944 |
| 2,413,170 | Clark | Dec. 24, 1946 |
| 2,418,109 | Sconce | Apr. 1, 1947 |

FOREIGN PATENTS

| Number | Country | Date |
|---|---|---|
| 836,719 | France | Jan. 25, 1939 |
| 503,322 | Great Britain | Apr. 3, 1939 |

OTHER REFERENCES

Chemical Abstracts, vol. 37, page 75. (Copy in Div. 6.)